United States Patent [19]

Katsuma et al.

[11] Patent Number: 4,513,219
[45] Date of Patent: Apr. 23, 1985

[54] VIBRATION WAVE MOTOR

[75] Inventors: Makoto Katsuma, Kawasaki; Hiroyasu Murakami, Tokyo; Akira Hiramatsu, Yokohama, all of Japan

[73] Assignee: Canon Kabushiki Kaisha, Tokyo, Japan

[21] Appl. No.: 552,373

[22] Filed: Nov. 16, 1983

[30] Foreign Application Priority Data

Nov. 25, 1982 [JP] Japan .................. 57-206299
Nov. 25, 1982 [JP] Japan .................. 57-206300

[51] Int. Cl.³ ........................................... H01L 41/08
[52] U.S. Cl. ........................................... 310/328; 310/317
[58] Field of Search ............... 310/311, 328, 317; 318/116, 118

[56] References Cited

U.S. PATENT DOCUMENTS

| 3,389,274 | 6/1968 | Robertson | 310/328 |
| 3,649,856 | 3/1972 | O'Neill | 310/328 |
| 4,019,073 | 4/1977 | Vishnevsky | 310/8.2 |
| 4,400,641 | 8/1983 | Vishnevsky et al. | 310/328 X |

FOREIGN PATENT DOCUMENTS

| 0573828 | 9/1977 | U.S.S.R. | 310/328 |
| 0612357 | 6/1978 | U.S.S.R. | 310/328 |
| 0646395 | 2/1979 | U.S.S.R. | 310/328 |

Primary Examiner—Mark O. Budd
Attorney, Agent, or Firm—Fitzpatrick, Cella, Harper & Scinto

[57] ABSTRACT

A pair of electro-strain element groups each having at least one polarized or non-polarized electro-strain element are arranged or polarized phase-differentially, and the electro-strain element groups are electrically insulated from each other and the electro-strain element groups and a vibrating member are also electrically insulated from each other. Pulse voltages of different phases derived from one DC power supply are applied to the respective electro-strain element groups, and a moving member press-contacted to the vibrating member is friction-driven by a travelling vibration wave generated in the vibrating member.

10 Claims, 9 Drawing Figures

VIBRATION WAVE MOTOR

BACKGROUND OF THE INVENTION

1. Field of the Invention

The present invention relates to a structure of a vibration wave motor driven by a travelling vibration wave.

2. Description of the Prior Art

As disclosed in U.S. Pat. No. 4,019,073, a vibration wave motor transduces a vibration caused by an application of a periodic voltage to an electro-strain element to a rotational motion or a one-dimensional motion. Since it does not require any winding unlike a conventional electric motor, it is simple in structure and compact, provides a high torque at a low rotating speed and has a small inertial rotation.

However, the prior art vibration wave motor friction drives a movable member such as a rotor which contacts to a vibrating member to transduce a standing wave vibration created in the vibrating member to a unidirectional motion of the moving member.

In order to reverse the direction of motion, it is necessary to change a mechanical structure such as to change a contact position and/or a contact angle of the vibrating member and the moving member. Accordingly, a large scale device is needed to attain the reversible vibration wave motor and the advantages of the vibration motor, that is, the simple structure and the compactness are lost.

In order to resolve the above problem, a vibration wave motor driven by a travelling vibration wave has been recently proposed.

Figure 1:
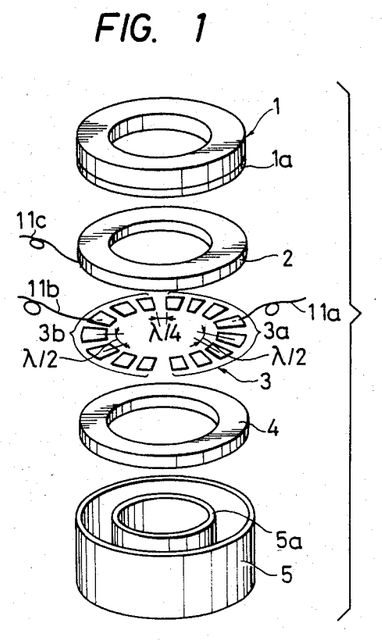
FIG. 1 is a developed view of a structure of a prior art vibration wave motor.

FIG. 1 shows a structure of such a vibration wave motor, in a disassembled state.

A vibration absorber 4, a metal ring vibrating member 2 having electro-strain elements 3 mounted on a side facing the absorber 4 and a moving member 1 are inserted, in this order, in a central cylinder 5a of a stator 5 serving as a base. The stator 5, the absorber 4, the electro-strain elements 3 and the vibrating member 2 are mounted in a manner not to rotate relative to each other. The moving member 1 is press-contacted to the vibrating member 2 by its gravity or urging means, not shown, in order to keep an integrity of the motor.

A plurality of electro-strain elements 3a are arranged at a pitch of one-half of a wavelength λ of the vibration wave, and a plurality of electro-strain elements 3b are also arranged at the pitch of λ/2. Instead of the plurality of electro-strain element 3a (or 3b), a single element polarized at the pitch of λ/2 may be used. The electro-strain elements 3a and 3b are arranged phase-differentially to each other such that the pitches are staggered by $(n_0+\frac{1}{4})\lambda$, where $n_0=0, 1, 2, 3, \ldots$. Lead wires 11a are connected to the electro-strain elements 3a and lead wires 11b are connected to the electro-strain elements 3b. They are connected to an A.C. power supply 6a and a 90° phase shifter 6b (see FIG. 2). A lead wire 11c is connected to the metal vibrating member 2 and it is connected to the A.C. power supply 6a.

A friction area 1a of the moving member 1 is made of a hard rubber to offer a high friction force and reduce abrasion and it is press-contacted to the vibrating member 2.

Figure 2:
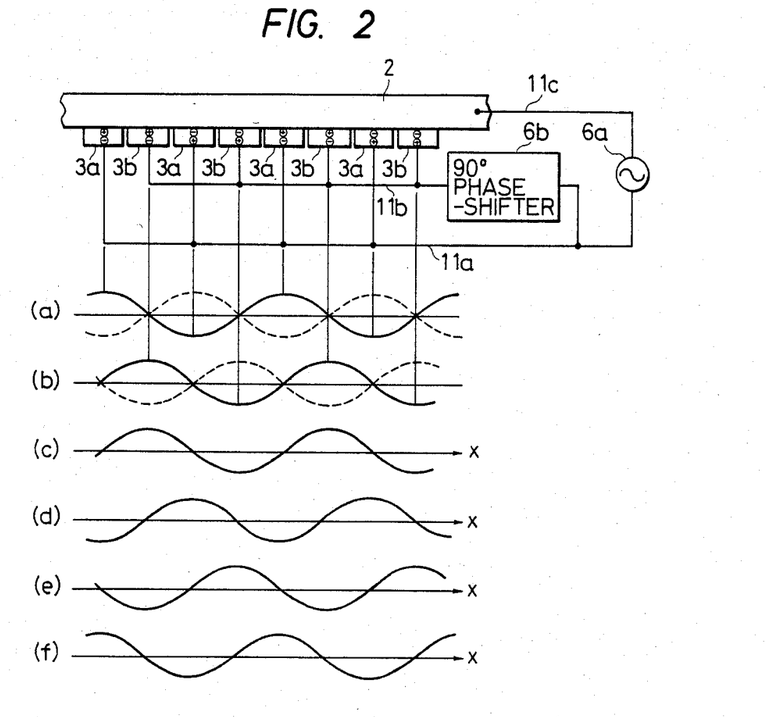
FIG. 2 illustrates a drive mechanism of the vibration wave motor.

FIG. 2 shows generation of the vibration wave in the motor. While the electro-strain elements 3a and 3b attached to the metal vibrating member 2 are shown adjacent to each other for the sake of convenience of explanation, they meet the requirement of λ/4 phase shift described above and are essentially equivalent to the arrangement of the electro-strain elements 3a and 3b of the motor shown in FIG. 1. Symbols ⊕ shown in the electro-strain elements 3a and 3b indicate that they expand in a positive cycle of the A.C. voltage, and symbols ⊖ indicate that they shrink in the positive cycle of the A.C. voltage.

The metal vibrating element 2 is used as an electrode for the electro-strain elements 3a and 3b, and an A.C. voltage of $V=V_0 \sin \omega t$ is applied to the electro-strain elements 3a from the A.C. power supply 6a and an A.C. voltage of $V=V_0 (\omega t \pm \pi/2)$ which is λ/4 phase shifted by the 90° phase shifter 6b is applied to the electro-strain elements 3b from the A.C. power supply 6a. The sign + or − in the equation is selected by the phase shifter 6b depending on the direction of movement of the moving member 1 (not shown in FIG. 2). When the + sign is selected, the phase is shifted by +90° and the moving member 1 is moved in a forward direction, and when the − sign is selected, the phase is shifted by −90° and the moving member 1 is moved in the reverse direction.

Let us assume that the − sign is selected and the voltage of $V=V_0 \sin (\omega t - \pi/2)$ is applied to the electro-strain elements 3b. When only the electro-strain elements 3a are vibrated by the voltage of $V=V_0 \sin \omega t$, a standing wave vibration is generated as shown in FIG. 2(a), and when only the electro-strain elements 3b are vibrated by the voltage of $V=V_0 \sin (\omega t - \pi/2)$, a standing wave vibration as shown in FIG. 2(b) is generated.

When the two A.C. voltages having the phase shift therebetween are simultaneously applied to the electro-strain elements 3a and 3b, respectively, the vibration wave travels. FIG. 2(c) shows a wave at time $t=2n\pi/\omega$, FIG. 2(d) shows a wave at time $t=\pi/2\omega+2n\pi/\omega$, FIG. 2(e) shows a wave at time $t=\pi/\omega+2n\pi/\omega$ and FIG. 2(f) shows a wave at time $t=2\pi/2\omega+2n\pi/\omega$. As seen, a wave front of the vibration wave travels in an x-direction.

Such a travelling vibration wave has a longitudinal wave and a transverse wave. Looking at a mass point A of the vibrating member 2 shown in FIG. 3, it makes a counterclockwise rotating elliptic motion by a longitudinal amplitude u and a transverse amplitude w. The moving member 1 is press-contacted (arrow p) to the surface of the vibrating member 2 and it contacts only to an apex of the vibrating plane. It is therefore driven by elliptic components of the longitudinal amplitude of the elliptic motions at mass points A, A′, . . . at the apexes that it is moved in a direction of an arrow N.

Figure 3:
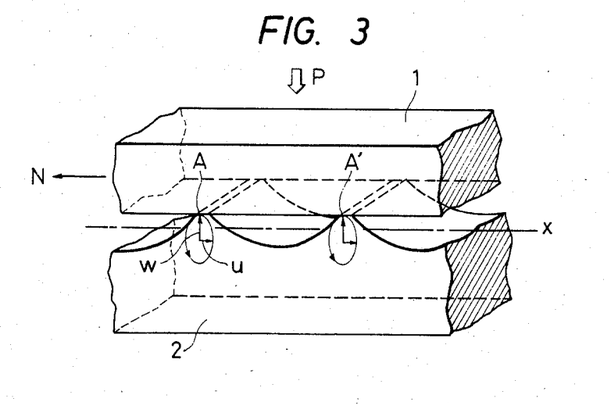
FIG. 3 illustrates a principle of the vibration wave motor.

A velocity of the mass point A at the apex is $V=2\pi fu$ (where f is a frequency). A velocity of movement of the moving member 1 depends on it and also depends on the transverse amplitude w because of the friction drive by the press-contact. Thus, the velocity of movement of the moving member 1 is proportional to the magnitude of the elliptic motion of the mass point A and the magnitude of the elliptic motion is proportional to the voltage applied to the electro-strain elements.

However, since the metal elastic vibrating member 2 is used as the common electrode to the electro-strain elements 3a and 3b in the prior art vibration wave motor as described above, the A.C. voltage source or the positive and negative voltage sources for generating the A.C. voltage are required as the driving power source.

In such a vibration motor, the lead wires for supplying the voltage to the electro-strain elements are soldered directly to the electro-strain elements. Accordingly, it is not adapted to mass production, the solders are apt to be torn off by the vibration, the vibration frequency varies depending on the quantity of the solders, and the electro-strain elements are deteriorated by the heat of soldering.

SUMMARY OF THE INVENTION

It is an object of the present invention to provide a vibration wave motor which resolves the above problems, is simple in structure and can be driven by a single DC voltage supply.

It is another object of the present invention to provide a vibration wave motor in which electro-strain elements are contacted to a conductive vibrating member on the opposite side to a vibrating member and the absorber is used as one of electrodes.

The other objects of the present invention will be apparent from the following description of the preferred embodiments of the present invention.

DETAILED DESCRIPTION OF THE PREFERRED EMBODIMENTS

Figure 4:
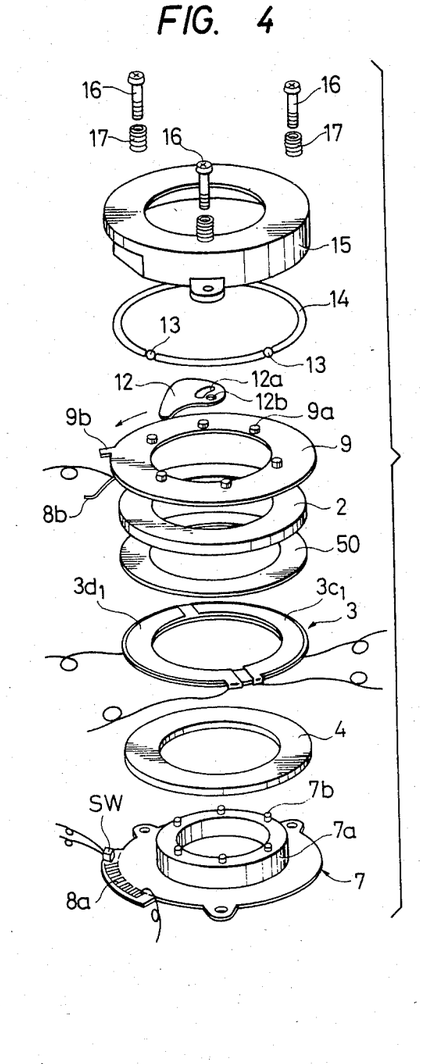
FIG. 4 is a developed view of a diaphragm unit embodying the present invention.

FIG. 4 shows an automatic diaphragm unit for a lens used in cameras such as still camera, movie camera, television camera and video camera, and projectors such as movie projector and enlarger. The like elements to those shown in FIG. 1 are designated by like numerals.

Numeral 7 denotes a base, and an absorber 4, an electro-strain element 3, an insulator 50, a vibrating member 2 and a rotating member 9 which is a moving member are inserted, in this order, into a central cylinder 7a of the base 7. A diaphragm vane 12 is arranged thereon. A circular aperture 12b and an arcuate aperture 12a of the vane 12 engage with a projection 7b of the base 7 and a projection 9a of the rotating member 9, respectively, and thrust bearings 13 are positioned by spacers 14 and pressed by a pressing plate 15. The pressing plate 15 is pressed to the base 7 by springs 17 and they are linked together by bolts 16 to maintain an integrity of the diaphragm unit and form a portion of a lens barrel (not shown).

The base 7 has an arcuate comb-shaped electrode 8a formed in an outer periphery, which contacts to a sliding element 8b projecting from the rotating member 9 to produce a signal in accordance with a rotation angle of the rotating member 9. An open reset switch SW is mounted at an end of the electrode 8a and it is actuated by a projection 9b formed on the rotating member 9. The absorber 4 may be made of rubber and serves to absorb the vibration of the vibrating member 2.

Figures 5A, 5B, 5C:
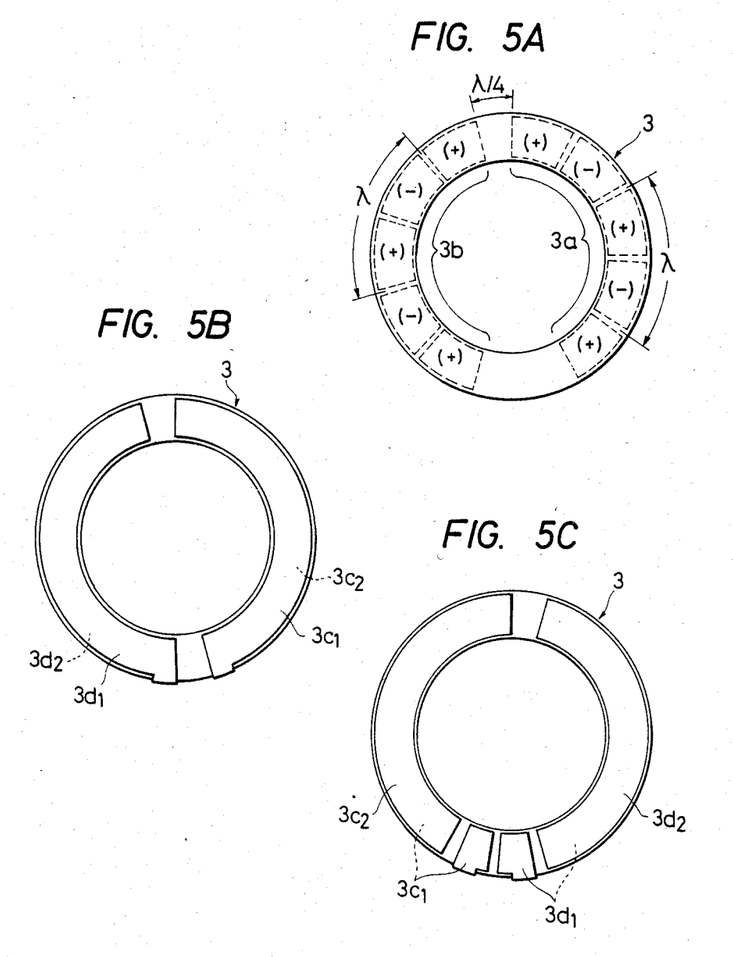
FIGS. 5A–5C show polarization, front surface and rear surface of electro-strain elements shown in FIG. 4.

The electro-strain element 3 serves as a vibration source when a voltage is applied thereto. As shown in FIG. 5A, it has two polarized portions 3a and 3b each having a plurality of polarized areas. The polarized portions 3a and 3b are physically staggered by one-quarter wavelength ($\lambda/4$). Symbols (+) and (−) show directions of polarization. In the (+) area, the element is expanded when the voltage is applied, and in the (−) area, the element is shrinks when the voltage is applied. A length determined by a sum length of the (+) area and the (−) area corresponds to one wavelength ($\lambda$) of the input frequency. A circumference of the electro-strain element ring 3 is an integer multiple of the length determined by the sum length of the (+) area and the (−) area. In the illustrated example, it is six times as long as the sum length.

FIG. 5(b) shows electrode patterns $3c_1$ and $3d_1$ on an upper surface (facing the insulator 50) of the electro-strain element 3, and FIG. 5(c) shows electrode patterns $3c_2$ and $3d_2$ on a lower surface (facing the absorber 4). The electrodes $3c_1$ and $3d_1$ on the upper surface are guided to the lower surface while they are insulated from each other. The electrodes $3c_1$ and $3c_2$ are disposed at the position corresponding to the polarized portion 3a, and the electrodes $3d_1$ and $3d_2$ are disposed at the position corresponding to the polarized portion 3b. They are connected to the lead wires on the lower surface so that the voltage is applied to the polarized portions 3a and 3b.

The insulator 50 is inserted between the metal elastic vibrating member 2 and the electro-strain element 3 when they are bonded and serves to insulate the electrodes $3c_1$ and $3d_1$ of the electro-strain element 3 from each other.

The vibration wave generated in the vibrating member 2 rotates the rotating plate 9 press-contacted to the vibrating member 2. As the rotating plate 9 is rotated, the diaphragm vane 12 which engages with the projection 9a is pivotably advanced or retracted around the shafts 7b and 12b along the arcuate aperture 12a. Since the diaphragm vane 12 is provided one for each of the projections 9a (although only one vane is shown in FIG. 4), the central aperture is stopped or opened as the diaphragm vanes are pivotably advanced or retracted.

Figure 6:
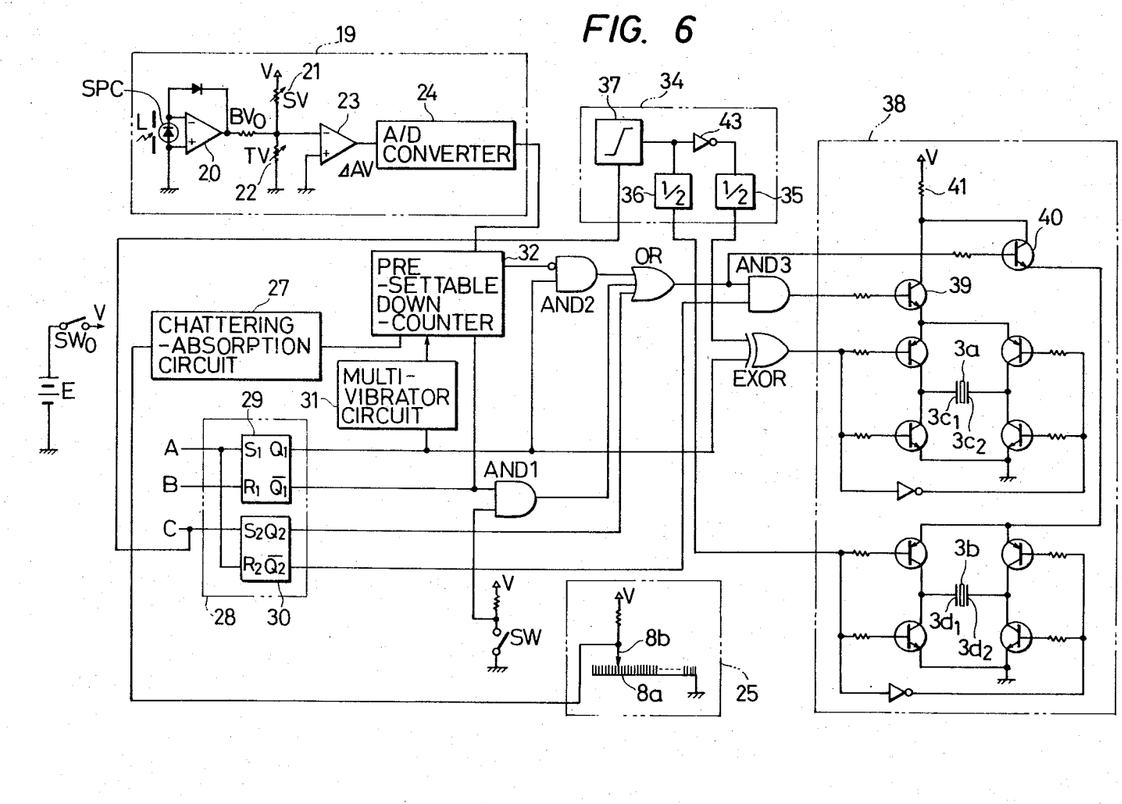
FIG. 6 shows a drive control circuit for the diaphragm unit of FIG. 4.

FIG. 6 shows a control circuit for the automatic diaphragm unit described above, which is applied to a still camera of a type of exposure setting at maximum aperture. E denotes a power supply battery and $SW_0$ denotes a power switch.

A circuit 19 including a photosensor SPC and an operational amplifier 20 is a light measurement circuit which converts a brightness of an object to an electrical signal and produces an electrical signal representing brightness information ($B_V$) at an output terminal. Potentiometers 21 and 22 constitute photographing information input means. When film sensitivity information ($S_V$) and exposure information (for example, shutter time $T_V$) are set, the photographing information input means produces an electrical signal in accordance with the set information. Numeral 23 denotes an operating amplifier for determining an aperture value. The amount $\Delta A_V$ to be stopped from the full open aperture state is given by $$\Delta A_V = A_V - A_{V0} \tag{1}$$

where $A_V$ is the aperture value to be controlled and $A_{V0}$ is the full open aperture value.

Since the light L is measured at the full open aperture, the light amount applied to the photosensor SPC, that is, the output $B_{V0}$ of the SPC is given by $$B_{V0} = B_V - A_{V0} \quad (2)$$

where $B_V$ is the brightness of the object. By modifying the apex operation $$B_V + S_V = A_V + T_V$$

by the equations(1) and (2), we get $$(B_V - A_{V0}) + S_V - T_V = A_V - A_{V0} = \Delta A_V$$

This is the output of the operational amplifier 23. The number of stop steps of the automatic diaphragm unit is determined by the output $\Delta A_V$. Numeral 24 denotes an analog-to-digital converter which converts the number of stop steps signal $\Delta A_V$ from the operational amplifier 23 to a digital signal.

Numeral 25 denotes a pulse generator which generate a pulse each time when the slider 8b contacts the comb-shaped electrode as the rotating member 9 is rotated, by means of the slider 8b (see FIG. 4) which slides on the electrode 8a and the resistor 26. Numeral 27 denotes a chattering absorption circuit which eliminates a chattering component from the signal supplied from the electrode 8a connected to the power supply through the resistor 26.

Numeral 28 denotes a circuit for controlling the stop operation by the diaphragm activation signal. Numeral 30 denotes a flip-flop which is set by a power supply signal C synchronized with a first step stroke of a shutter release to produce a signal $\theta_2$ and reset by a diaphragm control start signal A to produce a signal $\bar{\theta}_2$. Numeral 29 denotes a flip-flop which is set by the diaphragm control start signal A synchronized with a second step stroke of the shutter release to produce a signal $\theta_1$ and reset by an exposure control end signal B to produce a signal $\bar{\theta}_1$. Numeral 31 denotes a monostable multivibrator which produces a signal pulse of a very short duration in response to the output $\theta_1$ from the circuit 29. Numeral 32 denotes a presettable decrement counter which is reset by the output $\theta_1$ from the circuit 29 and preset with the output data from the analog-to-digital converter 24 in response to the output signal from the monostable multivibrator 31 triggered by the output $\bar{\theta}_1$ of the circuit 29. It counts down the preset data in response to the output from the chattering absorption circuit 27 and produces a carry output when the counting is over.

SW denotes a switch (see FIG. 4) which is closed when the diaphragm is in the open position and opened when the diaphragm vanes are stopped even slightly.

Numeral 34 denotes a pulse generator. An output from an oscillator 37 is supplied to a frequency divider 36 and to a frequency divider 35 through a NOT circuit 43. The pulse generator 34 is triggered by the power supply signal C and produces pulses of 90° phase difference from each other.

Numeral 38 denotes a driver for driving the polarized portions 3a and 3b of the electro-strain element. It is a push-pull circuit constructed by a plurality of transistors, resistors and NOT circuits. Numerals 39 and 40 denote switching transistors for switching the power supply to apply the voltage to the polarized portions 3a and 3b, respectively, of the electro-strain element through the push-pull circuit.

AND1, AND2 and AND3 denote AND circuits, OR denotes an OR circuit and EXOR denotes an exclusive OR circuit, which are known per se.

In the photographing operation by the camera having the above diaphragm unit, the power switch $SW_0$ is turned on at the first step stroke of the shutter release and the circuits such as the light measurement and pulse generating circuit 30 are energized.

In the circuit 19, the operational amplifier 23 calculates the diaphragm stop value $\Delta A_V$ based on the brightness of the object, the photographing information $T_V$ and the sensitivity information $S_V$, and the resulting $\Delta A_V$ value is converted to a digital value by the converter 24.

The circuit 30 is set by the signal C at the first step stroke of the shutter release and the "H" signal at the $\theta_2$-output is supplied to the OR circuit, which produces the "H" output, which in turn closes the transistor 40. The "L" signal at the $\bar{\theta}_2$-output is supplied to the AND3, which produces the "L" signal, which in turn opens the transistor 39. Thus, the voltage is applied to the polarized portion 3b but no voltage is applied to the polarized portion 3a.

As the pulse generator 34 is triggered by the signal C, the output pulse from the frequency divider 36 is supplied to the push-pull circuit for the polarized portion 3b. As a result, the polarized portion 3b vibrates but the polarized portion 3a does not vibrate because no voltage is applied thereto as described above. Accordingly, a standing wave is generated in the vibrating member 2 and the rotating member 9 does not rotate but stores a vibration energy.

The circuit 30 is reset by the diaphragm control start signal A generated at the second step stroke of the shutter release and the $\theta_2$-output produces the "L" signal and the $\bar{\theta}_2$-output produces the "H" signal. The circuit 29 is set and its $\theta_1$-output produces the "H" signal and the $\bar{\theta}_1$-output produces the "L" signal. The counter 32 which receives the $\theta_1$-output at the reset terminal thereof is now released from the reset state and the counter 32 presets the digital value applied to the preset data input terminal thereof from the converter 24 in response to the output signal from the multivibrator 31 which is triggered by the $\bar{\theta}_1$-output.

The pulse signal from the frequency divider 35 is supplied to the EXOR. When the $\theta_1$-output is supplied thereto, the EXOR produces a pulse which is 90° in advance to the pulse signal from the frequency divider 36. Since the $\theta_1$-output is also supplied to the AND2, the AND2 produces the "H" signal and the OR also produces the "H" signal, which is supplied to the AND3 and keeps the transistor 40 closed. Since the $\bar{\theta}_2$-output applied to the other input terminal of the AND3 is also the "H" signal, the AND3 produces the "H" signal and the transistor 39 is closed.

As a result, the drive voltages having 90° phase difference are applied to the polarized portions 3a and 3b of the electro-strain element 3 to vibrate them. Thus, the vibrating wave is generated in the vibrating member 2 and the rotating member 9 is rotated in the direction of the arrow (see FIG. 4) so that the diaphragm vanes 12 are stopped from the open position.

As the rotating member 9 is rotated, the switch SW is opened and the comb-switch 8a and 8b is repeatedly turned on and off. The counter 32 counts down the number of pulses corresponding to the rotation angle of the rotating member 9, supplied from the chattering absorption circuit 27 until the count reaches the preset count. When the count of the counter 32 reaches zero, it produces the carry output or the "H" signal and the AND2 produces the "L" signal, which is supplied to the OR. Since the input to the other input terminal of the OR is also the "L" signal, the OR produces the "L" signal and the AND3 also produces the "L" signal. As a result, the transistors 39 and 40 are both opened and the supply of the power is stopped.

As a result, the rotating member 9 is stopped and the diaphragm vanes 12 are stopped at the optimum aperture position. The aperture value $A_V$ presented by the diaphragm vanes 12 is equal to a sum of the full open aperture value $A_{V0}$ and the stopping aperture value $\Delta A_V$, that is, $$A_{V0} + \Delta A_V = A_V$$

When the exposure to a film is completed by the shutter operation, the circuit 29 is reset by the exposure control end signal B and the $\theta_1$-output produces the "L" signal and the $\bar{\theta}_1$-output produces the "H" signal, which is supplied to the AND1. Since the switch SW is open, the AND1 produces the "H" signal, which is supplied to the OR. Thus, the OR produces the "H" signal which is supplied to the AND3 and closes the transistor 40. Since the $\theta_2$-output of the circuit 30 is the "H" signal and the output of the OR is the "H" signal, the AND3 produces the "H" signal and the transistor 39 is closed. As a result, the polarized portions 3a and 3b of the electro-strain element 3 are both supplied with the power. Since the $\theta_1$-output of the circuit 29 is the "L" signal, the output of the frequency divider 35 is inverted by the EXOR. Accordingly, the output of the frequency divider 35 is 90° retarded to the output of the frequency divider 36.

As a result, the rotating member 9 is rotated in the opposite direction to the arrow by the travelling vibration wave of the vibrating member 2 due to the vibration of the electro-strain element portions 3a and 3b to open the diaphragm. When it is rotated to the open position, the switch SW is closed and the "L" signal is supplied to the AND1. Since the all inputs to the OR are the "L" signals, the OR produces the "L" signal which opens the transistors 39 and 40 to block the supply of power to the electro-strain element portions 3a and 3b. Thus, the diaphragm vanes 12 are stopped at the open position.

As seen from the above embodiment, according to the vibration wave motor of the present invention, the motor can be driven by the push-pull circuit driven by the single DC power supply without requiring the AC power supply. Therefore, the motor is very compact and simple and can be used in a wide range of applications.

While the insulator 50 is used in the embodiment to insulate the electrodes of the electro-strain element 3 from each other, the insulator may not be provided but the vibrating member 2 is made of aluminum and the surface thereof is almite-processed to form a $\gamma$-$Al_2O_3$ insulative layer to insulate the electrodes of the electro-strain element 3 from each other. Since the almite layer has a high surface hardness, the anti-abrasion property of the friction-drive surface to the moving member is enhanced.

The vibrating member 2 may be formed of a non-conductive material having a high Young's modulus, a high surface roughness and a high surface hardness such as ceramics.

Figure 7:
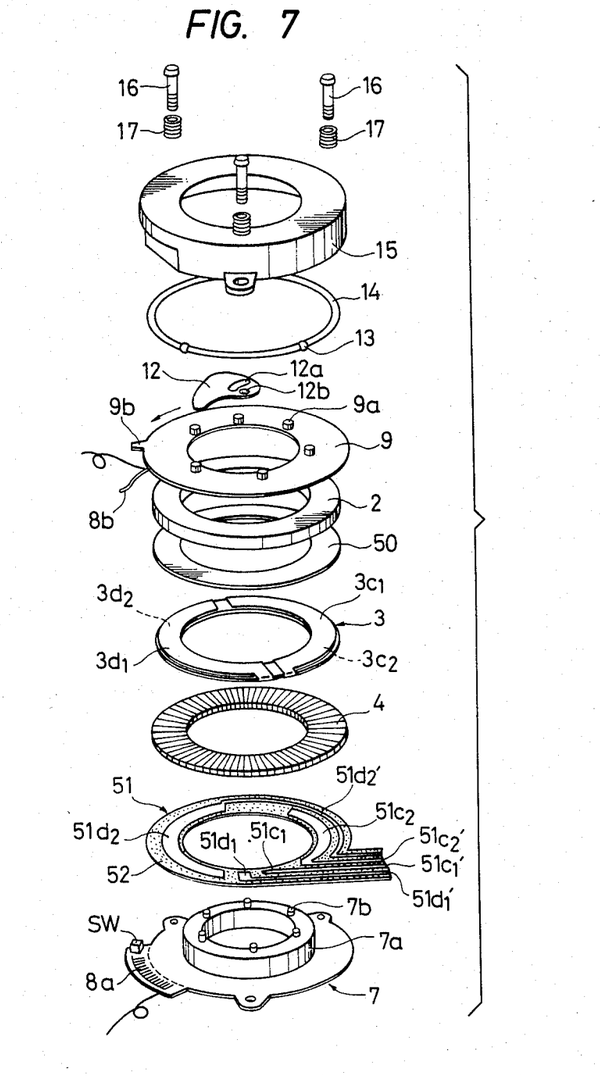
FIG. 7 is a developed view of a modification of FIG. 4.

FIG. 7 shows a modification of FIG. 4. The like elements to those shown in FIG. 4 are designated by the like numerals and they are not specifically explained here.

The lower surface of the electro-strain element 3 contacts to the conductive vibration absorber 4. The absorber 4 is elastic and Zebra-Gome (trade name) is radially embedded in the ring for insulation. Accordingly, the absorber 4 is conductive vertically but non-conductive circumferentially. A wiring plate 51 contacts to the absorber 4.

The wiring plate 51 is preferably flexible although it is not essential. Patterned electrodes $51c_1$, $51c_2$, $51d_1$ and $51d_2$ are formed on an insulative base 52. The electrode pattern $51c_1$ faces an electrode pattern $3c_1$ of the polarized portion 3a, the electrode pattern $51c_2$ faces an electrode pattern $3c_2$, the electrode pattern $51d_1$ faces an electrode pattern $3d_1$ and the electrode pattern $51d_2$ faces an electrode pattern $3d_2$. Line portions of the electrodes $51c_1$, $51c_2$, $51d_1$, and $51d_2$ are patterned to avoid the contact to the absorber 4 and they are connected to the push-pull circuit (see FIG. 6) of the voltage supply circuit. The voltage is applied to the polarized portion 3a through the electrodes $51c_1$, $3c_1$, $51c_2$ and $3c_2$, and to the polarized portion 3b through the electrodes $51d_1$, $3d_1$, $51d_2$ and $3d_2$.

In the vibration wave motor of FIG. 7, the lead wires need not be soldered directly to the electro-strain element 3. Accordingly, it is adapted to mass production and offers a stable quality and long life.

While the application of the present invention to the still camera has been specifically described, the present invention can also be applied to any diaphragm unit of the lens for any camera and projector, or a drive unit for other equipment or device.

What is claimed is:

1. A vibration wave motor comprising:
   (a) a pair of electro-strain element groups arranged or polarized phase-differentially, each group including at least one electro-strain element;
   (b) a vibrating member for generating a travelling vibration wave by application of voltages having a phase difference therebetween to said pair of electro-strain element groups;
   (c) a moving member press-contacted to said vibrating member to be friction-driven thereby;
   (d) a DC voltage generator for generating a DC voltage which is supplied to each of said pair of electro-strain element groups; and
   (e) a driving circuit for substantially applying an alternating voltage to said pair of electro-strain element groups by time divisionally alternating the direction of DC voltage to be applied to said pair of electro-strain element groups.

2. A vibration wave motor according to claim 1 further comprising an insulator for electrically insulating said pair of electro-strain element groups from each other and said pair of electro-strain element groups and said vibrating member from each other.

3. A vibration wave motor according to claim 1 wherein said pair of electro-strain element groups include two groups which are driven by said driving circuit with voltages having 90° phase difference from each other.

4. A vibration wave motor comprising:

(a) a pair of electro-strain element groups arranged or polarized phase-differentially, each group including at least one electro-strain element;

(b) a vibrating member for generating a travelling vibration wave by application of voltages having a phase difference therebetween to said pair of electro-strain element groups, said vibrating member being disposed on first surfaces of said pair of electro-strain element groups;

(c) a conductive vibration absorber disposed on second surfaces of said pair of electro-strain element groups, said absorber functioning as an electrode for said pair of electro-strain element groups;

(d) a moving member press-contacted to said vibrating member to be friction-driven by the travelling wave; and (e) a power source circuit for applying a driving voltage to said pair of electro-strain element groups through said conductive vibration absorber.

5. A vibration wave motor according to claim 4 wherein said absorber is subdivided and insulated such that said absorber is conductive longitudinally and non-conductive laterally.

6. A vibration wave motor according to claim 1, wherein said driving circuit comprises a reference pulse generating circuit and push-pull circuit, said driving circuit being driven in response to pulse generated in said reference pulse generating circuit.

7. A vibration wave motor comprising:

a pair of electro-strain element groups arranged or polarized phase-differentially, each group including at least one electro-strain element;

a vibrating member for generating a travelling vibration wave by application of voltages having a phase difference therebetween to said pair of electro-strain element groups, said vibrating member being disposed on first surfaces of said pair of electro-strain element groups;

a conductive member disposed on second surfaces of said pair of electro-strain element groups, said member functioning as an electrode for said pair of electro-strain element groups;

a moving member press-contacted to said vibrating member to be friction-driven thereby; and a power source circuit for applying a driving voltage to said pair of electro-strain element groups through said conductive member.

8. A vibration wave motor comprising:

(a) a vibration member including electro-strain element groups arranged or polarized phase-differentially for generating a travelling vibration wave by application of voltages having a phase difference therebetween to said pair of electro-strain element groups, each group including at least one electro-strain element;

(b) a moving member press-contacted to said vibrating member to be friction-driven thereby;

(c) a DC voltage generator for generating a DC voltage to be supplied to said pair of electro-strain element groups; and (d) a driving circuit for substantially applying an alternating voltage to said pair of electro-strain element groups by time divisionally alternating the direction of a DC voltage to be applied to said pair of electro-strain element groups.

9. A vibration motor comprising:

(a) a vibration member including a pair of electro-strain element groups arranged or polarized phase-differentially for generating a travelling vibration wave by application of voltages having a phase difference therebetween to said pair of electro-strain element groups, each group including at least one electro-strain element;

(b) a conductive member disposed in contact with said pair of electro-strain element groups, said member functioning as an electrode for said pair of electro-strain element groups;

(c) a moving member press-contacted to said vibrating member to be friction-driven thereby; and (d) a power source circuit for applying a driving voltage to said pair of electro-strain element groups through said conductive member.

10. A vibration wave motor comprising:

(a) a vibration member including a pair of electro-strain element groups arranged or polarized phase-differentially for generating a travelling vibration wave by application of voltages having a phase difference therebetween to said pair of electro-strain element groups, each group including at least one electro-strain element;

(b) a conductive vibration absorber disposed in contact with said pair of electro-strain element groups, said absorber functioning as an electrode for said pair of electro-strain element groups;

(c) a moving member press-contacted to said vibrating member to be friction-driven by said travelling vibration wave thereby; and (d) a power source circuit for applying a driving voltage to said pair of electro-strain element groups through said conductive absorber.

* * * * *

UNITED STATES PATENT AND TRADEMARK OFFICE
CERTIFICATE OF CORRECTION

PATENT NO. : 4,513,219

DATED : April 23, 1985

INVENTOR(S) : MAKOTO KATSUMA, ET AL.

It is certified that error appears in the above-identified patent and that said Letters Patent is hereby corrected as shown below:

Column 1, line 54, "11aare" should read --11a are--.

Column 2, line 27, "3bare" should read --3b are--.

Column 7, line 22, "$\theta_1$" should read --$\bar{\theta}_1$--.

Column 8, line 22, "$51c_2$, $51d_1$, and $51d_2$" should read --$51c_{2'}$, $51d_1$, and $51d_{2'}$--.

Signed and Sealed this

Eleventh Day of February 1986

[SEAL]

Attest:

DONALD J. QUIGG

Attesting Officer

Commissioner of Patents and Trademarks